(12) United States Patent
Liu

(10) Patent No.: US 11,369,146 B2
(45) Date of Patent: Jun. 28, 2022

(54) ELECTRONIC CIGARETTE

(71) Applicant: Tuanfang Liu, Shenzhen (CN)

(72) Inventor: Tuanfang Liu, Shenzhen (CN)

(*) Notice: Subject to any disclaimer, the term of this patent is extended or adjusted under 35 U.S.C. 154(b) by 411 days.

(21) Appl. No.: 16/718,150

(22) Filed: Dec. 17, 2019

(65) Prior Publication Data

US 2021/0045444 A1 Feb. 18, 2021

(30) Foreign Application Priority Data

Aug. 16, 2019 (CN) .......................... 201910756636.1
Aug. 16, 2019 (CN) .......................... 201921329169.6

(51) Int. Cl.
*A24F 40/44* (2020.01)
*A24F 40/46* (2020.01)
*A24F 40/50* (2020.01)
*H05B 3/44* (2006.01)
*F16J 15/02* (2006.01)

(52) U.S. Cl.
CPC .............. *A24F 40/44* (2020.01); *A24F 40/46* (2020.01); *A24F 40/50* (2020.01); *H05B 3/44* (2013.01); *F16J 15/022* (2013.01); *H05B 2203/021* (2013.01)

(58) Field of Classification Search
CPC ......... A24F 40/485; A24F 40/40; A24F 40/10
See application file for complete search history.

(56) References Cited

U.S. PATENT DOCUMENTS

2019/0174826 A1* 6/2019 Zhu .......................... H05B 3/04

FOREIGN PATENT DOCUMENTS

CN 109864348 A * 6/2019

* cited by examiner

*Primary Examiner* — Jean F Duverne
(74) *Attorney, Agent, or Firm* — Matthias Scholl P.C.; Matthias Scholl

(57) ABSTRACT

An electronic cigarette, including: an atomization assembly and a battery assembly. The atomization assembly includes a first cover; a first seal; a cylindrical bushing; a heating wire disposed in the cylindrical bushing; a monolayered cotton; a multilayered cotton; a funnel; a spring; a second seal sealing the funnel; an e-liquid tank; a third seal; a seal plug; a fixed seat fixing the heating wire; a fourth seal sealing the fixed seat; a first insulation ring; a joint; a second insulation ring; a fifth seal; a second cover; a sixth seal sealing the second cover; a magnet; and a casing. The battery assembly includes a seal ring; a first silicone gasket; a support frame; a foam; a battery; a control plate; a hollow air column; a pneumatic switch; a seventh seal sealing the pneumatic switch; a position limiter limiting the pneumatic switch; a slidable button; a second silicone gasket.

1 Claim, 5 Drawing Sheets

ELECTRONIC CIGARETTE

CROSS-REFERENCE TO RELAYED APPLICATIONS

Pursuant to 35 U.S.C. § 119 and the Paris Convention Treaty, this application claims foreign priority to Chinese Patent Application No. 201910756636.1 filed Aug. 16, 2019 and to Chinese Patent Application No. 201921329169.6 filed Aug. 16, 2019. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to an electronic cigarette.

Electronic cigarettes atomize nicotine-containing e-liquid.

SUMMARY

The disclosure provides an electronic cigarette.

The electronic cigarette comprises an atomization assembly and a battery assembly. The atomization assembly is disposed on the battery assembly.

The atomization assembly comprises a first cover; a first seal; a cylindrical bushing; a heating wire disposed in the cylindrical bushing; a monolayered cotton; a multilayered cotton; a funnel; a spring; a second seal sealing the funnel; an e-liquid tank; a third seal; a seal plug; a fixed seat fixing the heating wire; a fourth seal sealing the fixed seat; a first insulation ring; a joint; a second insulation ring; a fifth seal; a second cover; a sixth seal sealing the second cover; a magnet; and a casing.

The battery assembly comprises a seal ring; a first silicone gasket; a support frame; a foam; a battery; a control plate; a hollow air column; a pneumatic switch; a seventh seal sealing the pneumatic switch; a position limiter limiting the pneumatic switch; a slidable button; a second silicone gasket; a connector; a housing; a first decorative plate; a second decorative plate; a power button.

The magnet is disposed in a cavity of the second cover; the fifth seal is disposed on the second cover; the sixth seal is sheathed on the second cover; the second cover is disposed in the first cover; the spring and the second seal are disposed on the funnel; the funnel is disposed on the e-liquid tank; the third seal is sheathed on the seal plug; the seal plug is directly connected to the funnel; the e-liquid tank is disposed in one side of the cavity of the second cover; the multilayered cotton wraps the heating wire; the heating wire is disposed on the fixed seat; the first insulation ring, the joint, and the second insulation ring are sequentially disposed in a bottom cavity of the fixed seat; the fourth seal is sheathed on the fixed seat; the monolayered cotton wraps the fixed seat; the fixed seat is disposed in the cylindrical bushing; the first sleeve is sheathed on the cylindrical bushing.

The hollow air column is disposed on the support frame; the foam is attached to the battery; positive and negative anodes of the battery are connected to the pneumatic switch; the control plate is directly connected to the pneumatic switch; the seventh seal is disposed on the pneumatic switch; the pneumatic switch is disposed in the support frame and is limited by the position limiter; the seal ring and the first silicone gasket are sequentially disposed on the support frame; the magnet is disposed on the first silicone gasket; the second silicone gasket is sheathed on the slidable button; the connector is disposed in a groove of the housing, and the slidable button is directly connected to the connector; the power button is disposed on the housing; and the first decorative plate and the second decorative plate are attached to two surfaces of the housing, respectively.

DETAILED DESCRIPTION

To further illustrate, embodiments detailing an electronic cigarette are described below. It should be noted that the following embodiments are intended to describe and not to limit the disclosure.

Figure 1:
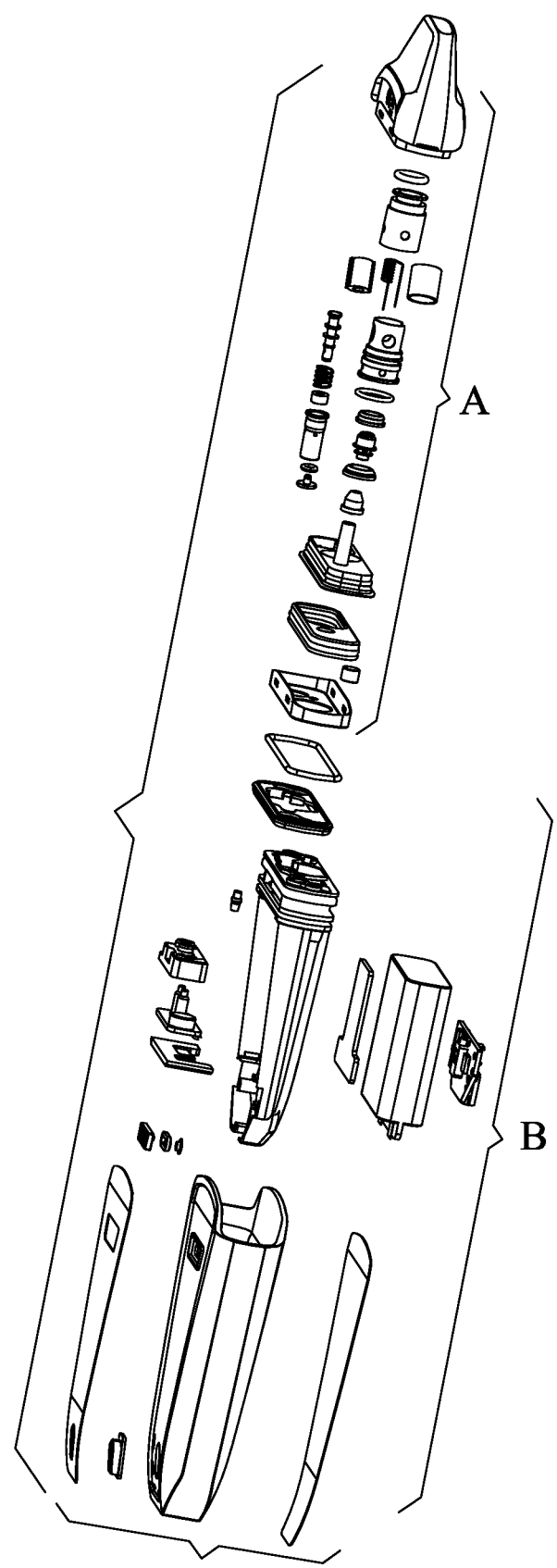
FIG. 1 is an exploded view of an electronic cigarette according to one embodiment of the disclosure.
Figure 2:
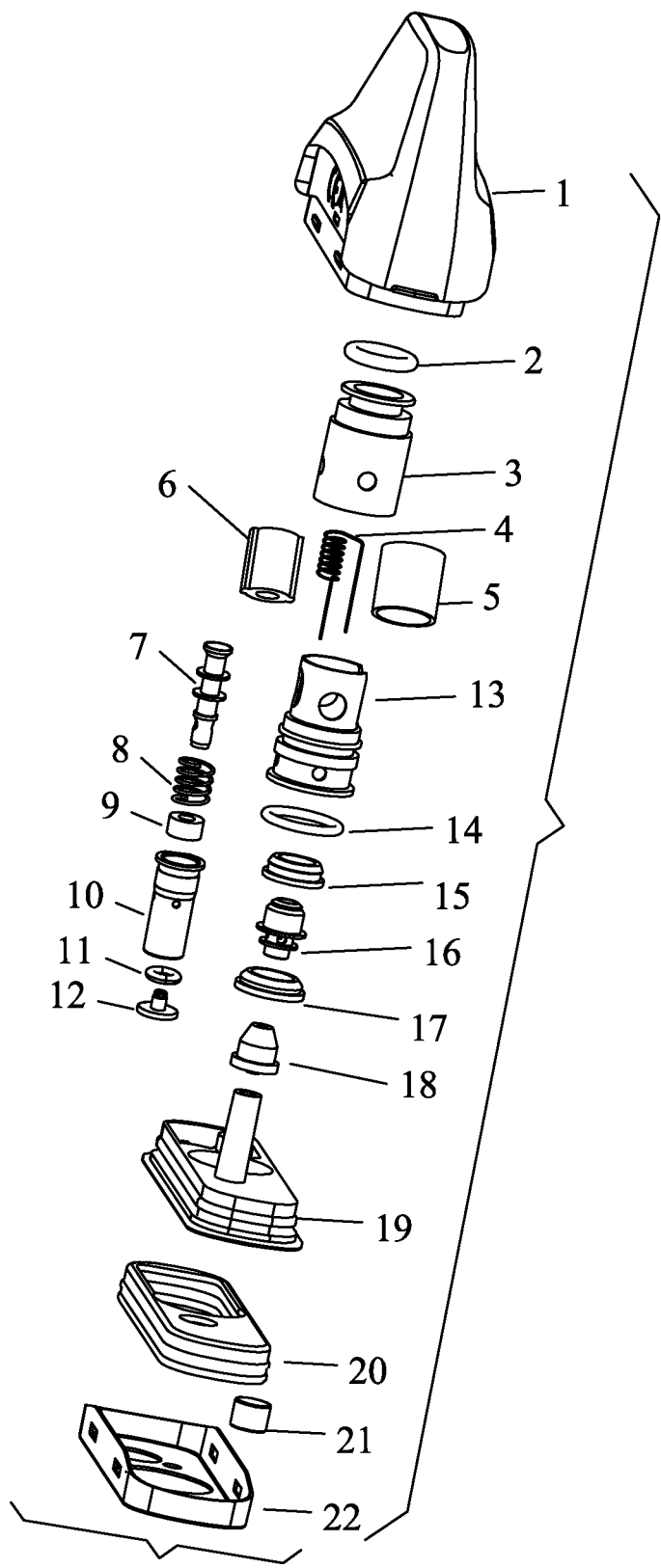
FIG. 2 is an exploded view of an atomization assembly of an electronic cigarette in FIG. 1.
Figure 3:
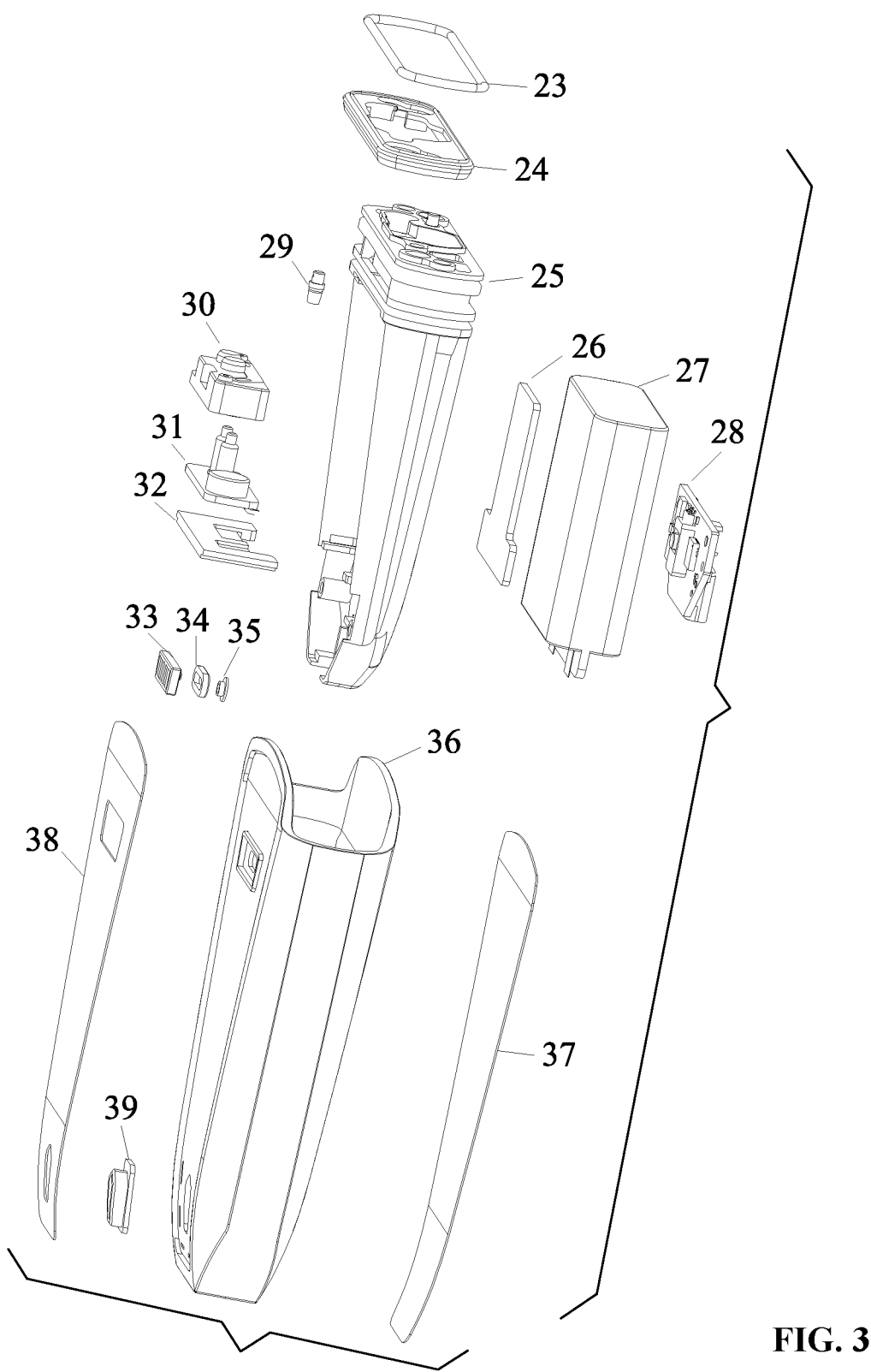
FIG. 3 is an exploded view of a battery assembly of an electronic cigarette in FIG. 1.
Figure 4:
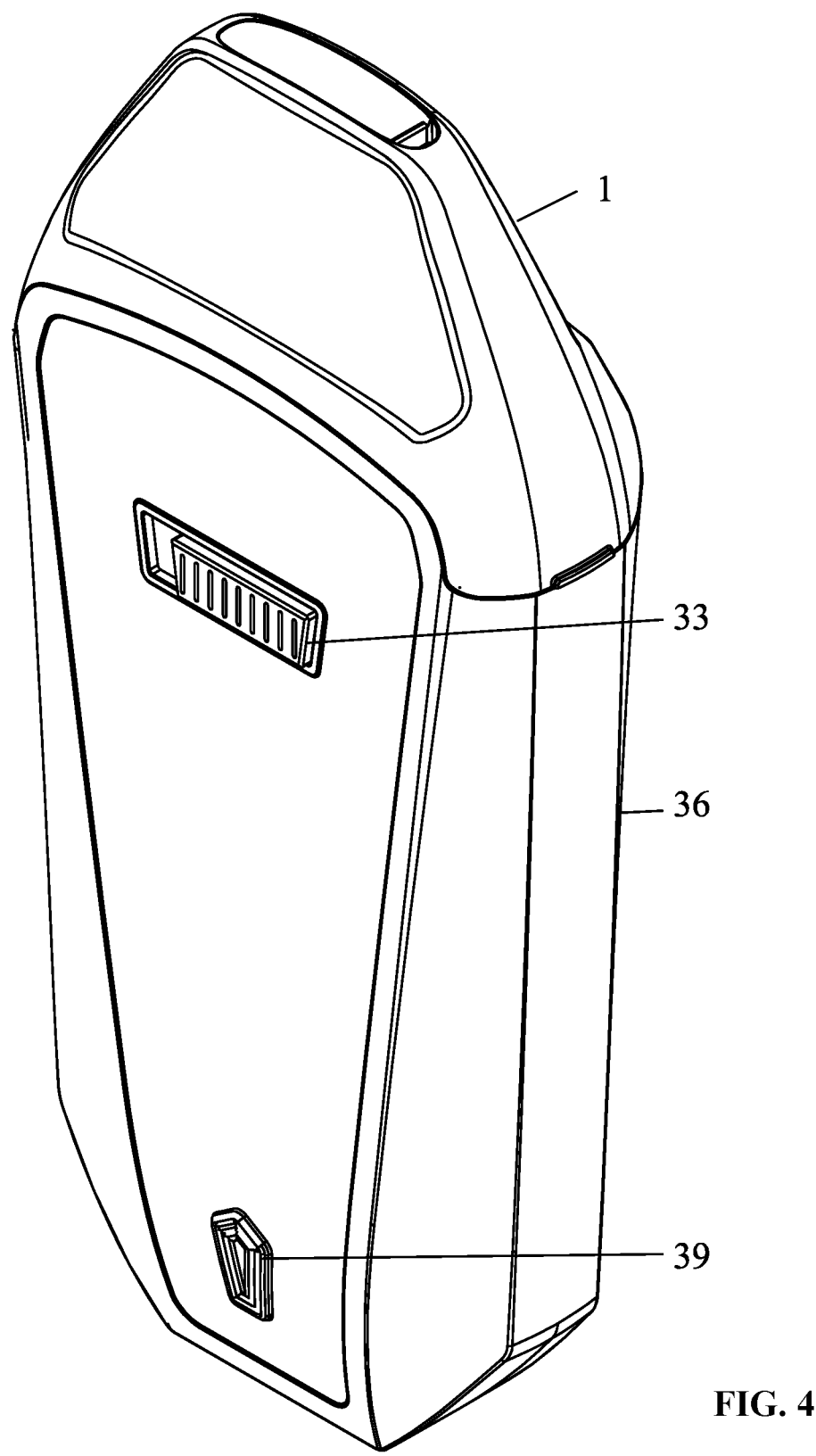
FIG. 4 is a stereogram of an electronic cigarette according to one embodiment of the disclosure.
Figure 5:
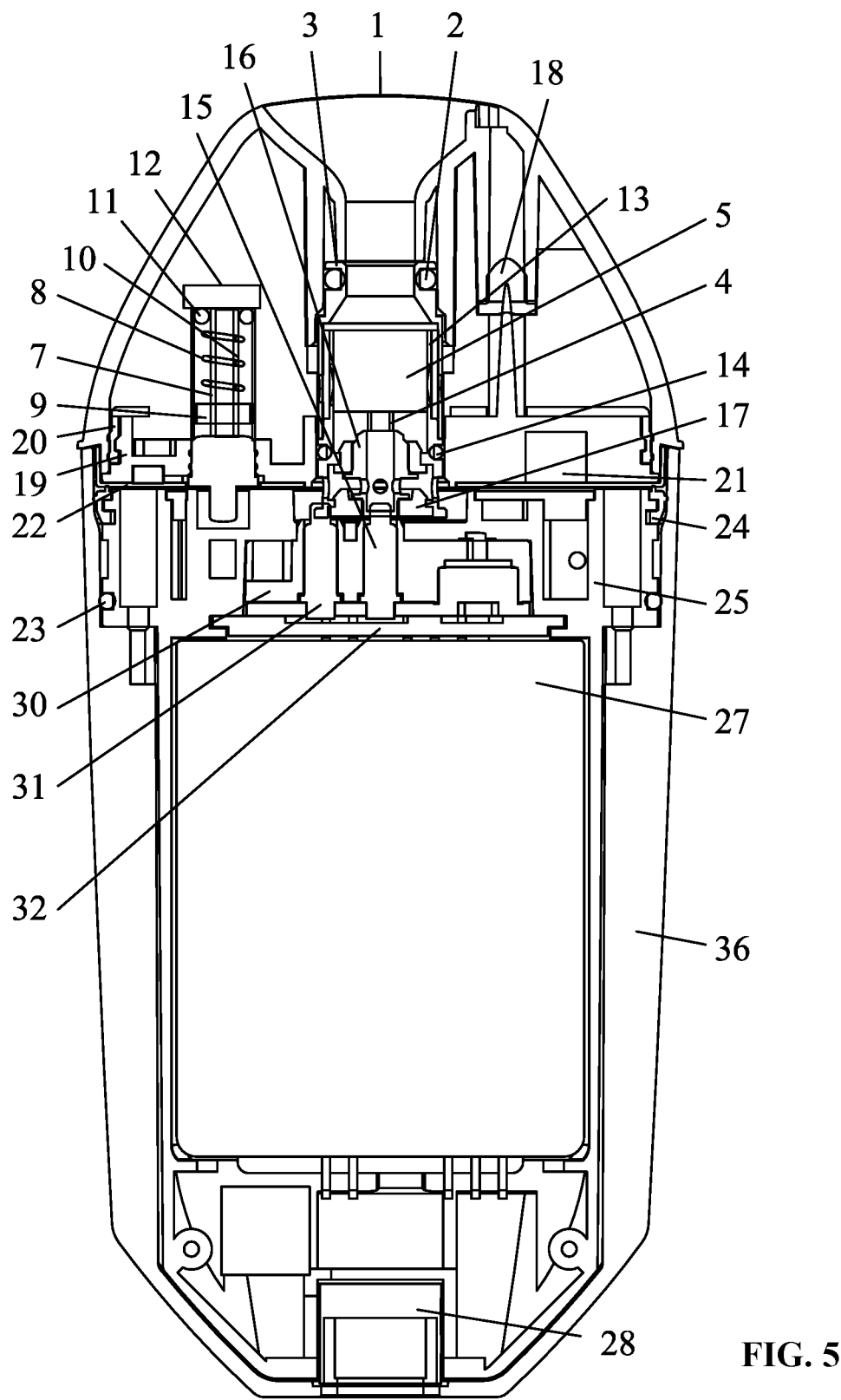
FIG. 5 is a sectional view of an electronic cigarette according to one embodiment of the disclosure.

As shown in FIGS. 1-5, an electronic cigarette comprises an atomization assembly A and a battery assembly B. The atomization assembly A is disposed on the battery assembly B. The atomization assembly A comprises a first cover 1; a first seal 2; a cylindrical bushing 3; a heating wire 4 disposed in the cylindrical bushing 3; a monolayered cotton 5; a multilayered cotton 6; a funnel 7; a spring 8; a second seal 9 sealing the funnel 7; an e-liquid tank 10; a third seal 11; a seal plug 12; a fixed seat 13 fixing the heating wire 4; a fourth seal 14 sealing the fixed seat 13; a first insulation ring 15; a joint 16; a second insulation ring 17; a fifth seal 18; a second cover 19; a sixth seal 20 sealing the second cover 19; a magnet 21; and a casing 22.

The battery assembly comprises a seal ring 23; a first silicone gasket 24; a support frame 25; a foam 26; a battery 27; a control plate 28; a hollow air column 29; a pneumatic switch 31; a seventh seal 30 sealing the pneumatic switch 31; a position limiter 32 limiting the pneumatic switch 31; a slidable button 33; a second silicone gasket 34; a connector 35; a housing 36; a first decorative plate 37; a second decorative plate 38; a power button 39.

The magnet 21 is disposed in a cavity of the second cover 19; the fifth seal 18 is disposed on the second cover 19; the sixth seal 20 is sheathed on the second cover 19; the second cover 19 is disposed in the first cover 1; the spring 8 and the second seal 9 are disposed on the funnel 7; the funnel 7 is disposed on the e-liquid tank 10; the third seal 11 is sheathed on the seal plug 12; the seal plug 12 is directly connected to the funnel 7; the e-liquid tank 10 is disposed in one side of the cavity of the second cover 19; the multilayered cotton 6 wraps the heating wire 4; the heating wire 4 is disposed on the fixed seat 13; the first insulation ring 15, the joint 16, and the second insulation ring 17 are sequentially disposed in a bottom cavity of the fixed seat 13; the fourth seal 14 is sheathed on the fixed seat 13; the monolayered cotton 5 wraps the fixed seat 13; the fixed seat 13 is disposed in the cylindrical bushing 3; the first sleeve 2 is sheathed on the cylindrical bushing 3.

The hollow air column 29 is disposed on the support frame 25; the foam 26 is attached to the battery 27; positive and negative anodes of the battery 27 are connected to the pneumatic switch 31; the control plate 28 is directly connected to the pneumatic switch 31; the seventh seal 30 is disposed on the pneumatic switch 31; the pneumatic switch 31 is disposed in the support frame 25 and is limited by the position limiter 32; the seal ring 23 and the first silicone gasket 24 are sequentially disposed on the support frame 25; the magnet 21 is disposed on the first silicone gasket 24; the second silicone gasket 34 is sheathed on the slidable button 33; the connector 35 is disposed in a groove of the housing 36, and the slidable button 33 is directly connected to the connector 35; the power button 39 is disposed on the housing 36; and the first decorative plate 37 and the second decorative plate 38 are attached to two surfaces of the housing 36, respectively.

The atomization assembly and the battery assembly are attracted to each other via the magnet 21. The slidable button is disposed on the housing 36 to adjust the size of the air inlet, thus achieving the adjustment of the vapor volume. The hollow air column 29 disposed on the support frame 25 can seal the air inlet communicating with the seventh seal 30, so that the air enters the electronic cigarette via the side air inlet, thus preventing the condensed e-liquid from flowing into the battery assembly. The spring 8 and the second seal 9 are disposed on the funnel disposed on the e-liquid tank 10. Press the spring, the e-liquid can flow into the e-liquid tank 10. The second seal 9 can prevent the leakage of the e-liquid.

It will be obvious to those skilled in the art that changes and modifications may be made, and therefore, the aim in the appended claims is to cover all such changes and modifications.

What is claimed is:

1. A device, comprising: an atomization assembly and a battery assembly; the atomization assembly comprising:
   1) a first cover;
   2) a first seal;
   3) a cylindrical bushing;
   4) a heating wire disposed in the cylindrical bushing;
   5) a monolayered cotton;
   6) a multilayered cotton;
   7) a funnel;
   8) a spring;
   9) a second seal sealing the funnel;
   10) an e-liquid tank;
   11) a third seal;
   12) a seal plug;
   13) a fixed seat fixing the heating wire;
   14) a fourth seal sealing the fixed seat;
   15) a first insulation ring;
   16) a joint;
   17) a second insulation ring;
   18) a fifth seal;
   19) a second cover;
   20) a sixth seal sealing the second cover;
   21) a magnet; and
   22) a casing;
   the battery assembly comprising:
   23) a seal ring;
   24) a first silicone gasket;
   25) a support frame;
   26) a foam;
   27) a battery;
   28) a control plate;
   29) a hollow air column;
   30) a pneumatic switch;
   31) a seventh seal sealing the pneumatic switch;
   32) a position limiter limiting the pneumatic switch;
   33) a slidable button;
   34) a second silicone gasket;
   35) a connector;
   36) a housing;
   37) a first decorative plate;
   38) a second decorative plate; and
   39) a power button;
   wherein:
   the magnet is disposed in a cavity of the second cover; the fifth seal is disposed on the second cover; the sixth seal is sheathed on the second cover; the second cover is disposed in the first cover;
   the spring and the second seal are disposed on the funnel; the funnel is disposed on the e-liquid tank; the third seal is sheathed on the seal plug; the seal plug is directly connected to the funnel; the e-liquid tank is disposed in one side of the cavity of the second cover;
   the multilayered cotton wraps the heating wire; the heating wire is disposed on the fixed seat; the first insulation ring, the joint, and the second insulation ring are sequentially disposed in a bottom cavity of the fixed seat; the fourth seal is sheathed on the fixed seat; the monolayered cotton wraps the fixed seat; the fixed seat is disposed in the cylindrical bushing; the first sleeve is sheathed on the cylindrical bushing;
   the hollow air column is disposed on the support frame; the foam is attached to the battery; positive and negative anodes of the battery are connected to the pneumatic switch; the control plate is directly connected to the pneumatic switch;
   the seventh seal is disposed on the pneumatic switch; the pneumatic switch is disposed in the support frame and is limited by the position limiter; the seal ring and the first silicone gasket are sequentially disposed on the support frame; the magnet is disposed on the first silicone gasket; and
   the second silicone gasket is sheathed on the slidable button; the connector is disposed in a groove of the housing, and the slidable button is directly connected to the connector; the power button is disposed on the housing; and the first decorative plate and the second decorative plate are attached to two surfaces of the housing, respectively.

* * * * *